US011698178B1

(12) United States Patent
Lee (10) Patent No.: US 11,698,178 B1
(45) Date of Patent: Jul. 11, 2023

(54) ILLUMINATING DEVICE AND A METHOD FOR OPTIMIZING THE LIGHT PATTERN

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 0 days.

(21) Appl. No.: 17/961,561

(22) Filed: Oct. 7, 2022

(51) Int. Cl.
*F21S 41/255* (2018.01)
*F21V 7/00* (2006.01)
*F21S 41/33* (2018.01)
*B62J 6/028* (2020.01)
*F21W 107/13* (2018.01)

(52) U.S. Cl.
CPC ............. *F21S 41/255* (2018.01); *B62J 6/028* (2020.02); *F21S 41/33* (2018.01); *F21V 7/005* (2013.01); *F21W 2107/13* (2018.01)

(58) Field of Classification Search
CPC ....... B62J 6/20; B62J 6/00; B62J 6/028; B62J 6/029; B62J 6/02; F21S 41/33; F21S 41/255; F21S 41/275; F21S 41/148; F21V 7/005; F21W 2107/13
See application file for complete search history.

(56) References Cited

U.S. PATENT DOCUMENTS

2013/0242589 A1\* 9/2013 Abe ........................ F21S 41/39 362/512
2017/0241605 A1\* 8/2017 Yamamoto ............ F21S 41/338

FOREIGN PATENT DOCUMENTS

JP 6019643 B2 \* 11/2016 ................ B60Q 1/04
WO WO-2014207817 A1 \* 12/2014 .......... F21S 48/1159

\* cited by examiner

*Primary Examiner* — Erin Kryukova (57) ABSTRACT

An illuminating device and a method for optimizing the light pattern are provided. The illuminating device includes a lamp case having a lighting space; a light-reflecting cup, located in the lighting space and including a light incident side, a light emergent side; a light source, located in the lighting space and corresponding to the light incident side of the light reflecting cup; and a cylindrical lens, located in the lighting space and corresponds to the light emergent side of the light reflecting cup; wherein one surface of the cylindrical lens has a plurality of convex columns extending up and down, and each convex column faces to the light emergent side; wherein, when the light source emits light, the main bright area of the light pattern reflected by the light emergent side of the light reflecting cup is wide at the top and narrow at the bottom.

2 Claims, 9 Drawing Sheets

ILLUMINATING DEVICE AND A METHOD FOR OPTIMIZING THE LIGHT PATTERN

FIELD OF THE DISCLOSURE

The present disclosure relates to an illuminating device and a method for optimizing the light pattern, and more particularly to an optimized structure and method that allows the light pattern of bicycles to be more uniform and easier to comply with safety regulations.

BACKGROUND OF THE DISCLOSURE

The use of lighting equipment is incredibly important to enable the clear observation of road conditions when a lack of light impairs usual daytime-level bicycle rider visibility. Due to these potentially dangerous conditions, even if the bicycle is not factory-equipped with installed safety illumination, many users choose to self-install bicycle lamps to improve the safety during nighttime riding.

However, when the same conditions are applied to automobiles and motorcycles, care must be taken to accommodate unique brightness issues. For example, while it is generally thought that a brighter and wider illumination range creates a higher safety-value for passengers, there is a need for further consideration. An excessively bright and wide illumination source affects driving safety because of blinding glare from oncoming cars. For additional safety, the low beam area is regulated. Standards which are widely adopted include K-mark (German standard) and E-mark (European standard). Auto manufacturers follow these standards while in the design phase. The standard of K-mark or E-mark ensures the low beam lights have a clear cut-off line of sight and darken to reduce the impact for oncoming cars.

A common design technique for regulation-compliance is to modify the reflector design in terms of adjustment to the shape of the emitted light. However, compared to automobiles and motorcycles, bicycle lights are smaller in size. This additional technical challenge must be considered for the design and manufacture of bicycle light reflectors. Since the reflector housing presents a smaller design footprint, it is more challenging for precise manufacturing. Therefore, current reflector products cannot maintain the same safety standards of specific lighting cutoff patterns described by the K-mark or E-mark standards.

Based on this background, it is urgent to address the limitations of current manufacturing technology in the bicycle light reflecting cup industry to ensure the safety for all light-equipped road vehicles.

SUMMARY OF THE DISCLOSURE

The present disclosure provides a light reflecting cup that reflects the light and a light emergent side refracts a light pattern. The main bright area of the aforementioned light pattern has the characteristics of being wide at the top and narrow at the bottom. Further, the light reflecting cup has a cylindrical lens on the light emergent side. When the light with the characteristics of being wide at the top and narrow at the bottom passes through the cylindrical lens, it will form a light pattern with a clear and smooth cut-off line, and the light pattern can meet the K-mark or E-mark specifications. Thereby, the present disclosure improves the problem of conventional bicycle lights in that the output light pattern is not ideal.

The present disclosure provides an illuminating device, comprising: a lamp case, having a lighting space; a light-reflecting cup, located in the lighting space and including a light incident side, a light emergent side; a light source, located in the lighting space and corresponding to the light incident side of the light reflecting cup; and a cylindrical lens, located in the lighting space and corresponds to the light emergent side of the light reflecting cup; wherein one surface of the cylindrical lens has a plurality of convex columns extending from top to bottom, and each convex column faces to the light emergent side; wherein, when the light source emits light, the main bright area of the light pattern reflected by the light emergent side of the light reflecting cup is wide at the top and narrow at the bottom.

Further, the light reflecting portion includes a road illumination portion, and part of the light emitted by the light source corresponds to the road illumination portion.

Further, the light source includes a high beam light source, the light reflecting portion includes a high beam light processing portion, and the high beam light source corresponds to the high beam light processing portion.

The present disclosure further provides a method for optimizing the light pattern, comprising: emitting a light from a light source in a lamp case to a light incident side of the light reflecting cup; and reflecting the light emitted to the light incident side through the lower narrow light processing portion and the upper wide light processing portion, and emitting through the light emergent side of the light reflecting cup; wherein the light reflecting cup includes a lower narrow light processing portion and an upper wide light processing portion; wherein, the main bright area of the light pattern reflected by the light emergent side of the light reflecting cup is wide at the top and narrow at the bottom; wherein, a cylindrical lens having a plurality of convex columns extending from top to bottom, and each convex column faces to the light emergent side; wherein, when the light which has the main bright area with wide at the top and narrow at the bottom of the light pattern passes through the cylindrical lens, the light pattern forms a clear and smooth cut-off line.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

For the sake of a detailed understanding of the embodiments of the present disclosure, the description can be read in conjunction with the drawings. As shown in FIGS. 1-6, the present disclosure provides an illuminating device, comprising: a lamp case 1, having a lighting space 11; a light-reflecting cup 2, located in the lighting space 11 and including a light incident side 21, a light emergent side 22; a light source 3, located in the lighting space 11 and corresponding to the light incident side 21 of the light reflecting cup 2; and a cylindrical lens 4, located in the lighting space 11 and corresponds to the light emergent side 22 of the light reflecting cup 2; wherein one surface of the cylindrical lens 4 has a plurality of convex columns 41 extending from top to bottom, and each convex column 41 faces to the light emergent side 22; wherein, when the light source 3 emits light, the main bright area A of the light pattern reflected by the light emergent side 22 of the light reflecting cup 2 is wide at the top and narrow at the bottom.

The power source of the light source 3 of the present disclosure can be a built-in power storage device in the lamp case 1, such as a battery or a rechargeable battery, or the lamp source 3 can be connected to an external power source by an additional wire to obtain power.

The light reflecting cup 2 can be replaced with optical elements such as optical lenses, transmissive lenses, etc., which can use refraction and/or reflection to change the light path.

Figure 1:
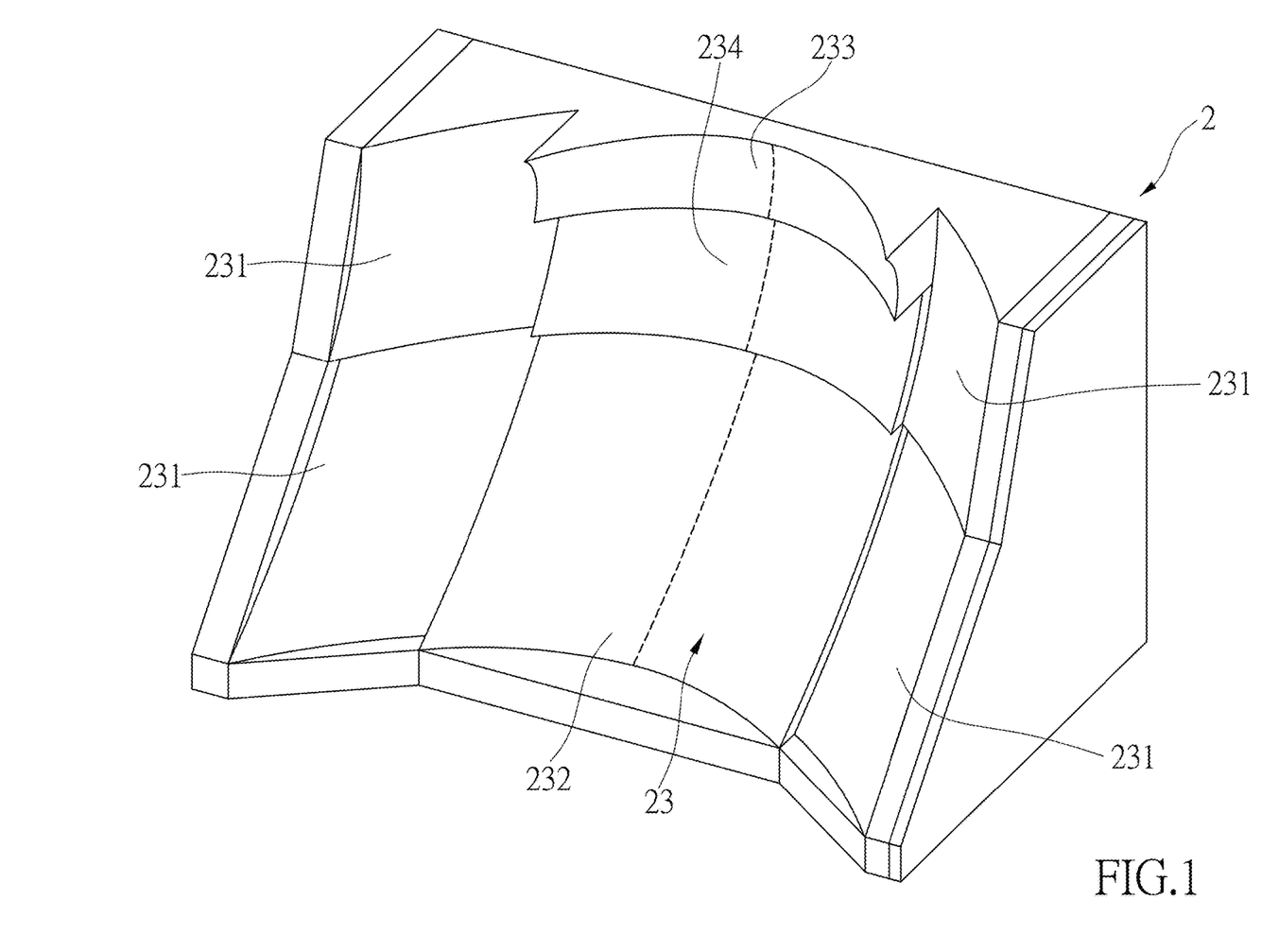
FIG. 1 is a perspective schematic view of the light reflecting cup of the present disclosure.
Figure 2:
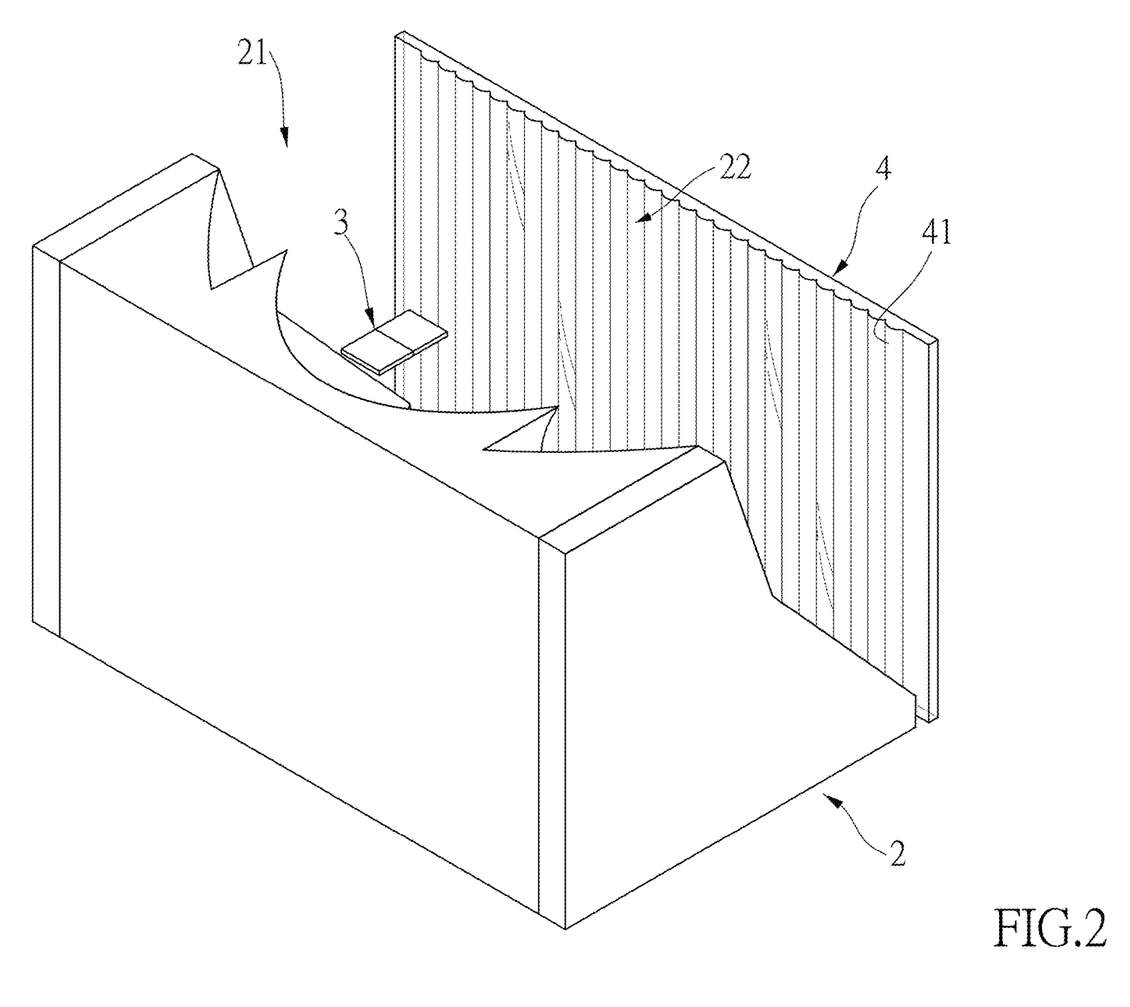
FIG. 2 is a perspective schematic view of the relative position of the light reflecting cup and the cylindrical lens of the present disclosure.
Figure 3:
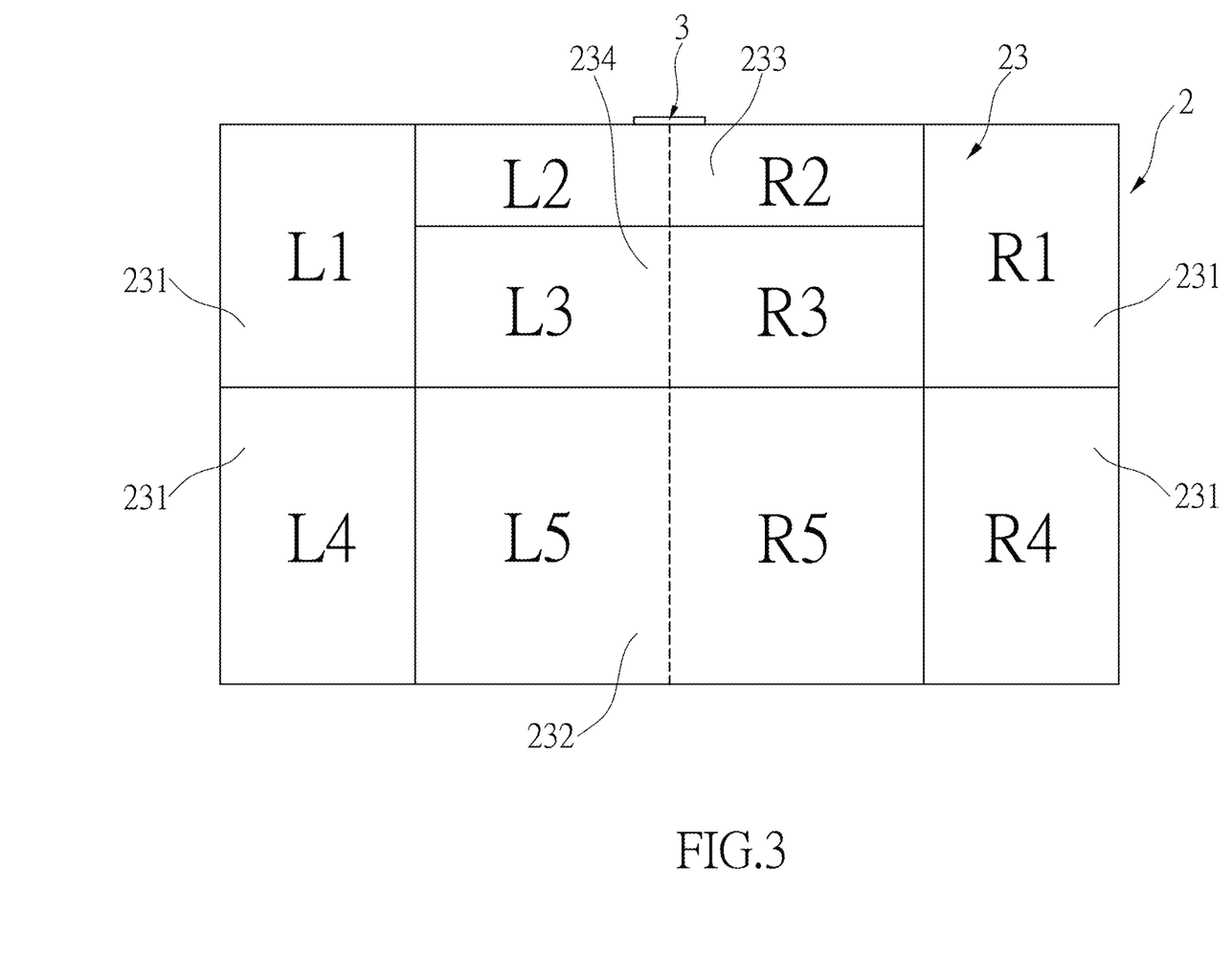
FIG. 3 is a perspective schematic view of the portion distribution of the light reflecting portion of the light reflecting cup of the present disclosure.
Figure 4:
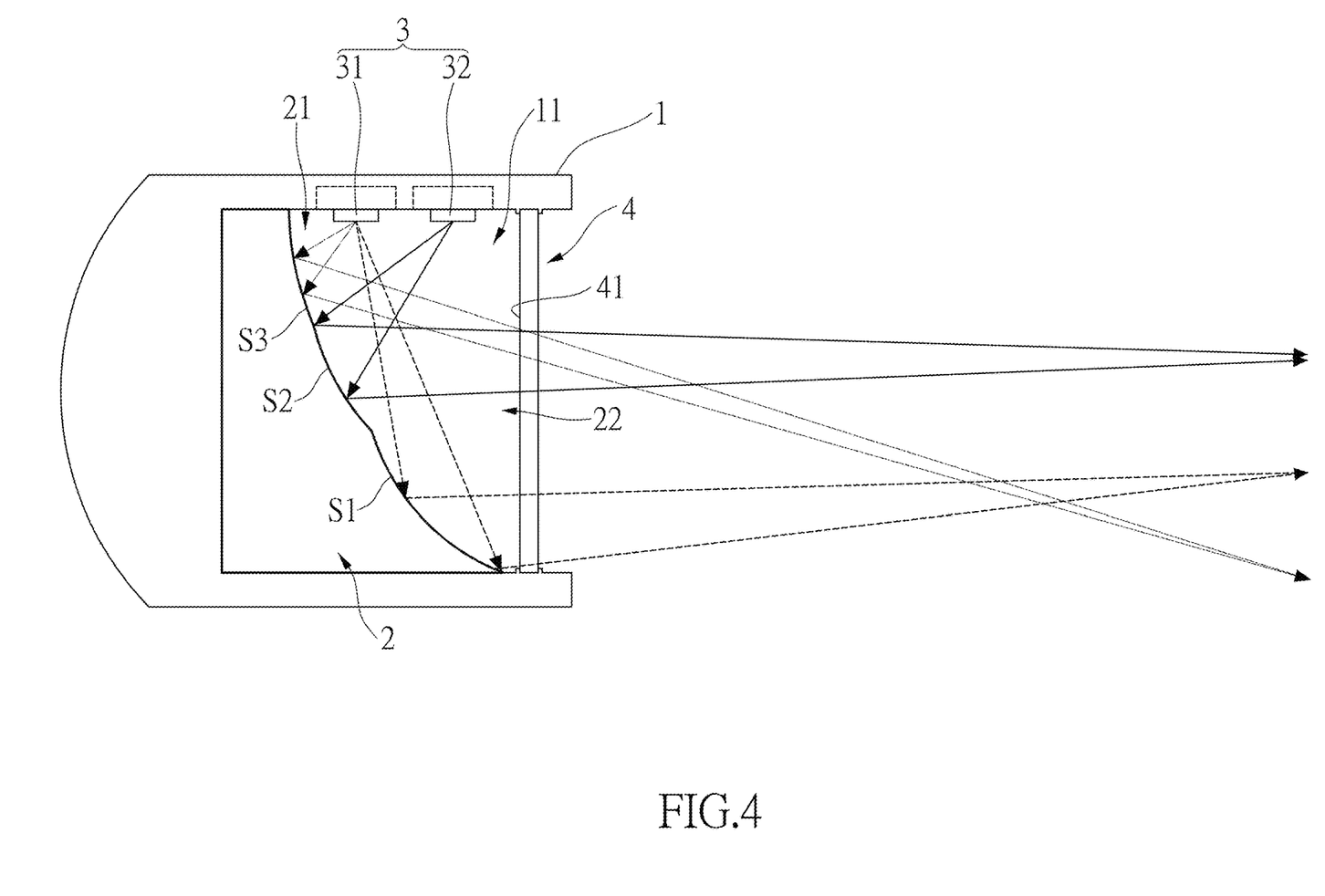
FIG. 4 is a perspective schematic view of the light path of the present disclosure.
Figure 5:
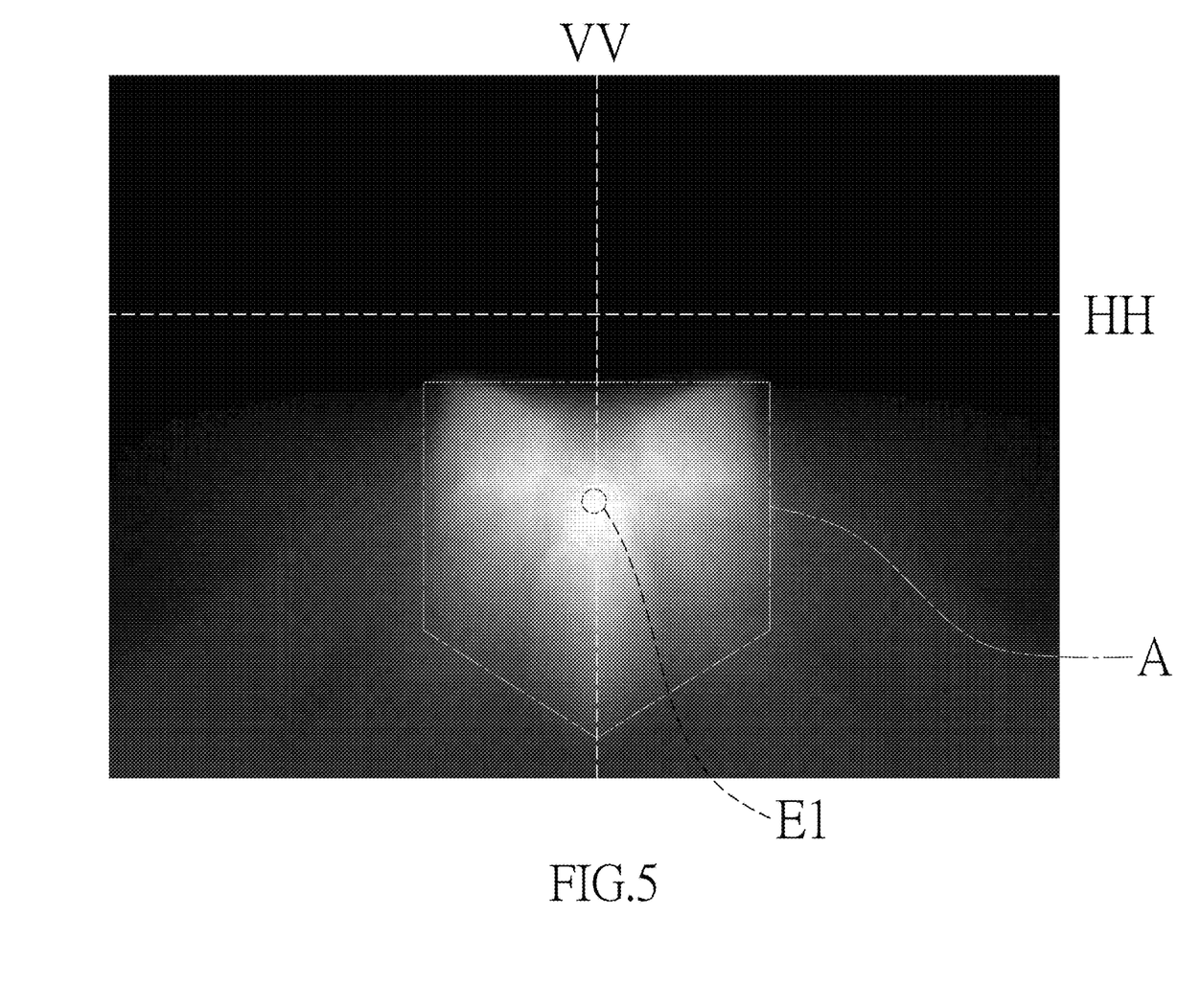
FIG. 5 is a schematic view of the light pattern outputted by the light emergent side of the light reflecting cup of the present disclosure.
Figure 6:
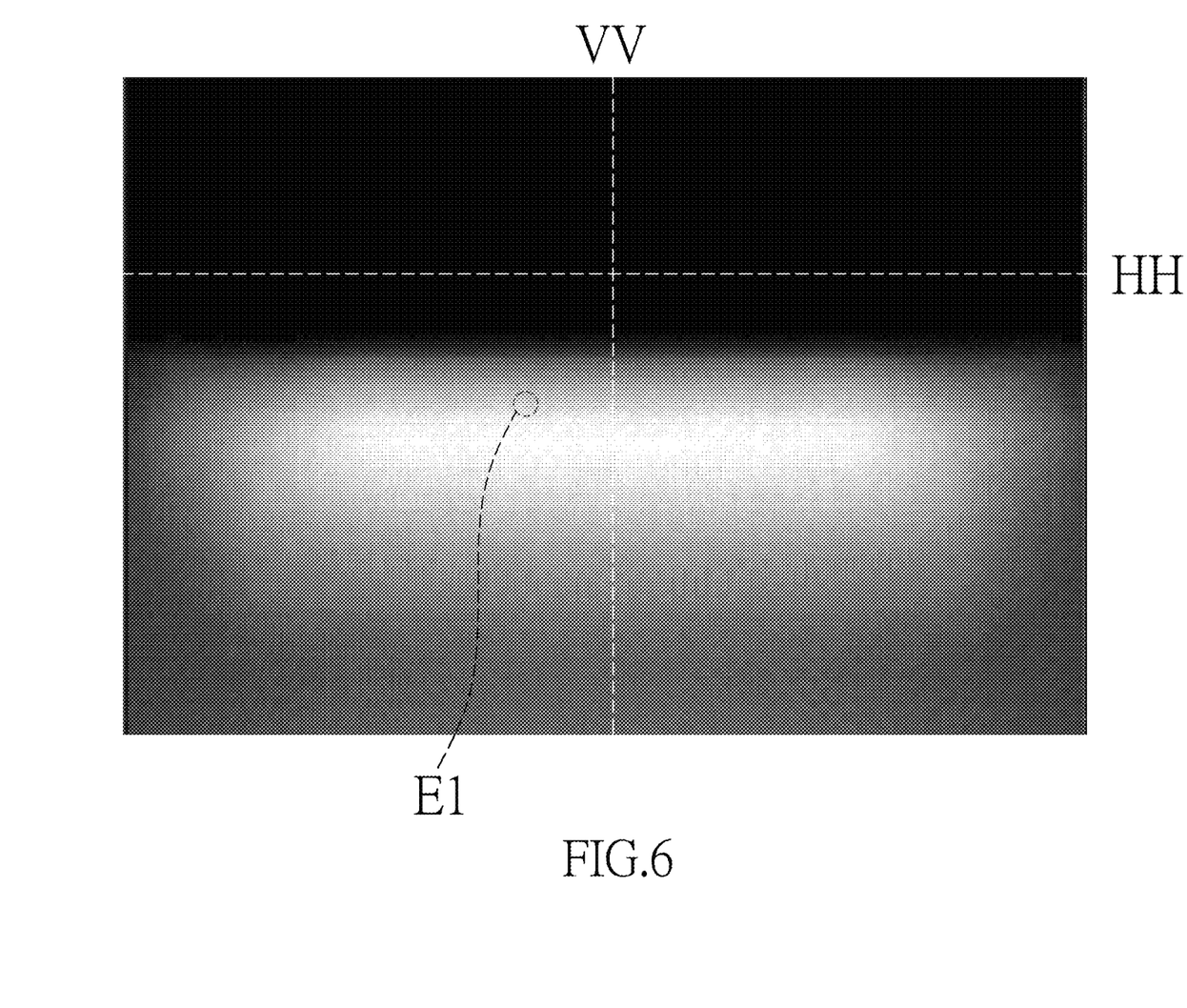
FIG. 6 is a schematic view of the light pattern that the light outputted by the light emergent side passes through the cylindrical lens of the present disclosure.

Firstly, referring to FIG. 4, the light incident side 21 of the light reflecting cup 2 can be divided into ten portions, as shown in FIG. 3. The L5 and R5 that are distant from the light source 3 are upper wide light processing portion 232 for processing upper wide light pattern. L1, R1, L4, and R4 are lower narrow light processing portion 231 for processing lower narrow light patterns. When the light source 3 emits light to the light incident side 21, the light will be processed (reflected) by the lower narrow light processing portion 231 and the upper wide light processing portion 232, and output through the light emergent side 22 of the light reflecting cup 2, the light pattern can be found in FIG. 5. The light pattern of the direct light that has not passed through the cylindrical lens 4 has the main bright area A wide at the top and narrow at the bottom. The present disclosure further provides a cylindrical lens 4 including a plurality of convex columns 41 extending from top to bottom. Each of the convex columns 41 faces to the light emergent side 22. When the light with the main bright area A with wide at the top and narrow at the bottom of the light pattern passes through the cylindrical lens 4, it will form a clear and smooth light pattern with a cut-off line and can meet the K-mark or E-mark specifications, as shown in FIG. 6.

Figure 7:
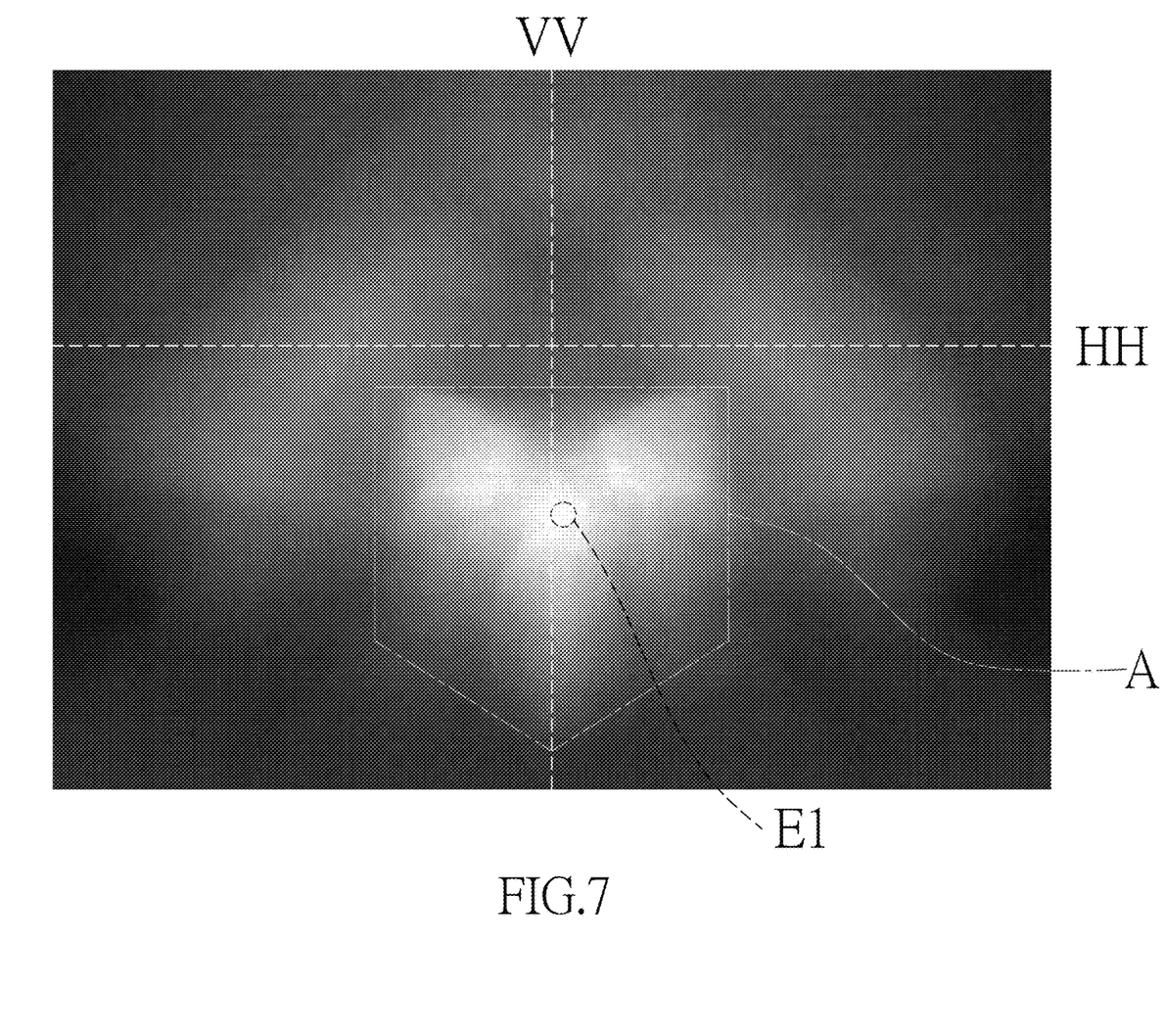
FIG. 7 is a schematic view of the high beam light pattern of the light emitted by the light emergent side of the light reflecting cup of the present disclosure.
Figure 8:
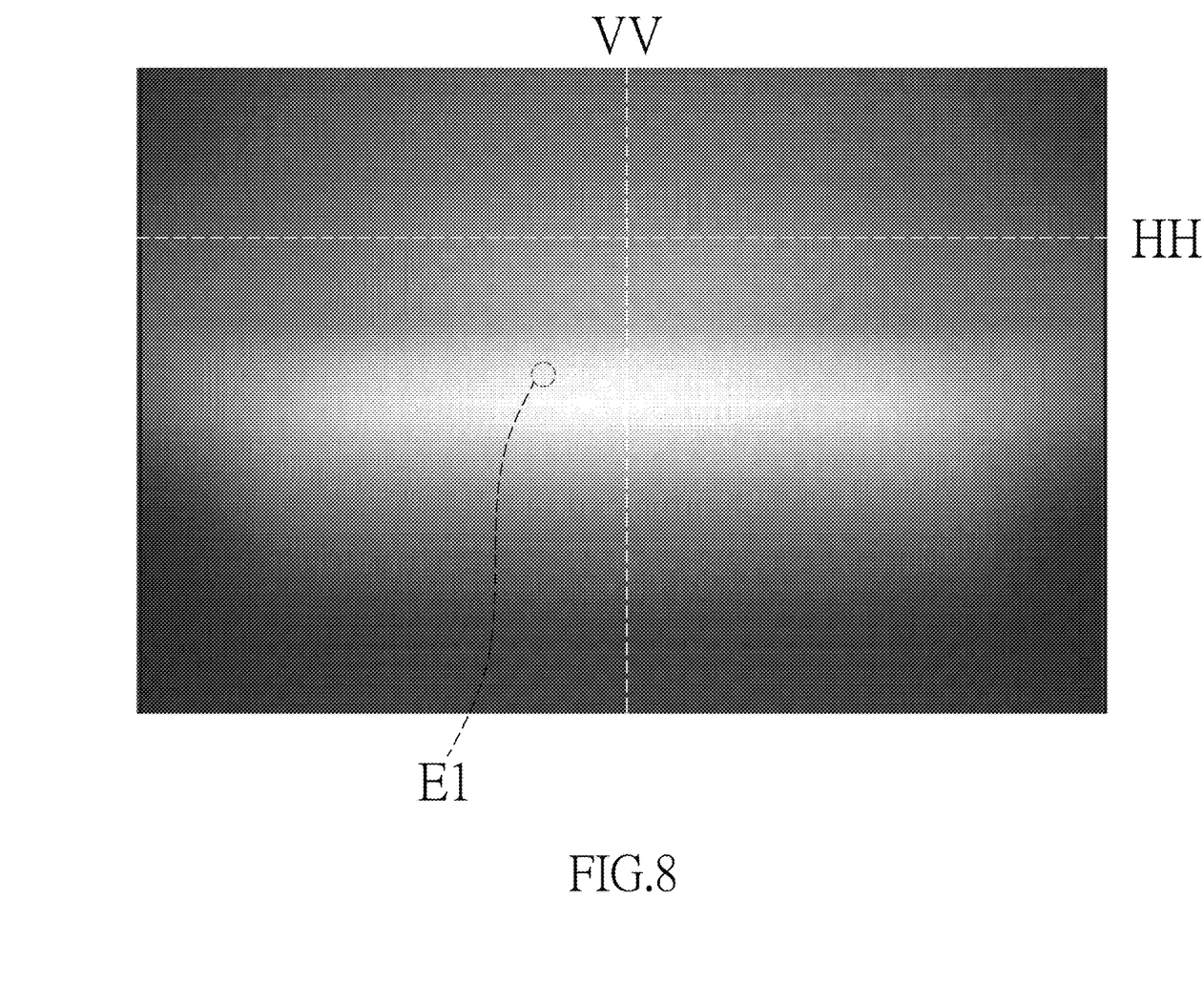
FIG. 8 is a schematic view of the high beam light pattern that the light outputted by the light emergent side passes through the cylindrical lens of the present disclosure.

Further, referring to FIGS. 3, L2 and R2 are road illumination portion 233 for providing road illumination to improve road brightness. L3 and R3 are high beam light processing portion 234 for providing high beam light. The actual light pattern can be found in FIG. 7 and FIG. 8.

Furthermore, as shown in FIG. 4, which is a schematic view of the light path, in which, the portion S3 corresponding to a low beam light source 31 reflects the road light, the portion S1 corresponding to a low beam light source 31 reflects the main bright area light, the portion S2 corresponding to the high beam light source 32 reflects the distant lighting.

Figure 9:
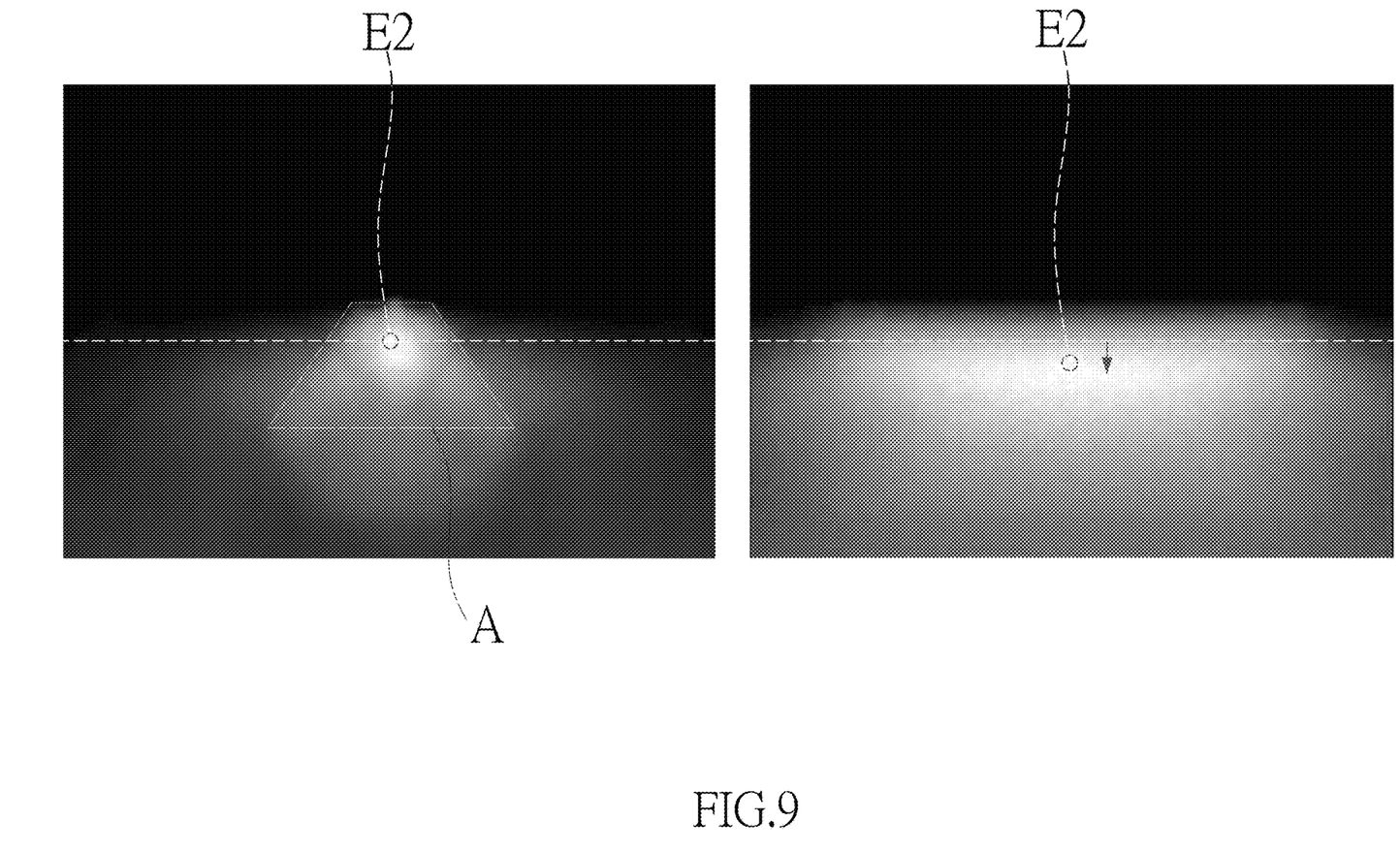
FIG. 9 is a schematic view of the light pattern of the wrong design.

In summary, the light outputted through the light emergent side 22 of the light reflecting cup 2 which the light pattern has a main bright area A with wide at the top and narrow at the bottom is important. According to FIG. 5 and FIG. 6, the light with the specific feature passing through the cylindrical lens 4 allows the highlight E1 moves toward the cut-off line. This advantage is the best result for vehicle lights. However, if the main bright area is designed with a narrow top and a wide bottom, it can be observed by FIG. 9, the left light does not pass through the cylindrical lens, and the right light passes through the cylindrical lens, so that the brightest point E2 will be distant from the cut-off line after passing through the cylindrical lens, which is an undesired phenomenon for vehicle lights.

It should be noted that the light pattern figures presented in the present disclosure are all pictures illuminated to a front wall ten meters away from the illuminating device of the present disclosure.

What is claimed is:

1. An illuminating device, comprising:
   a lamp case having a lighting space;
   a light-reflecting cup, located in the lighting space and including a light incident side and a light emergent side wherein the light-reflecting cup includes a light reflecting portion having a lower narrow light processing portion and upper wide light processing, portion;
   a light source, located m the lighting space and corresponding to the light incident side of the light reflecting cup, and light emitted by the light source corresponds to the lower narrow light processing portion and the upper wide light processing portion; and
   a cylindrical lens, located in the lighting space and corresponding to the light emergent side of the light reflecting cup; wherein one surface of the cylindrical lens has a plurality of convex columns extending from top to bottom, and each convex column faces the light emergent side;
   wherein, when the light source emits the light, a main bright area of a light pattern reflected by the light reflecting portion of the light reflecting cup is wide at the top and narrow at the bottom;
   wherein the light source includes a high beam light source, the light reflecting portion includes a high beam light processing portion, and the high beam light source corresponds to the high beam light processing portion.

2. The illuminating device according to claim 1, wherein the light reflecting portion includes a road illumination portion, and pan of the light emitted by the light source corresponds to the road illumination portion.

* * * * *